United States Patent
Cotter

(10) Patent No.: US 6,731,648 B1
(45) Date of Patent: May 4, 2004

(54) METHOD AND APPARATUS FOR TRANSMITTING A RETURN SIGNAL IN A LOOP NETWORK

(75) Inventor: David Cotter, Woodbridge (GB)

(73) Assignee: British Telecommunications PLC, London (GB)

( * ) Notice: Subject to any disclaimer, the term of this patent is extended or adjusted under 35 U.S.C. 154(b) by 0 days.

(21) Appl. No.: 09/171,915

(22) PCT Filed: Sep. 16, 1998

(86) PCT No.: PCT/GB98/02804
§ 371 (c)(1),
(2), (4) Date: Oct. 29, 1998

(87) PCT Pub. No.: WO99/14900
PCT Pub. Date: Mar. 25, 1999

(30) Foreign Application Priority Data

Sep. 17, 1997 (EP) ............................................ 97307224
Oct. 22, 1997 (EP) ............................................ 97308409

(51) Int. Cl.⁷ .......................... H04L 12/26; H04L 12/28; G06F 17/00; G06F 15/16
(52) U.S. Cl. ...................... 370/458; 370/249; 370/254; 709/104; 709/235
(58) Field of Search ................................ 370/230, 254, 370/390, 396, 400, 410, 249, 458, 394, 448, 248, 241, 406; 709/235, 230, 224, 228, 232; 359/110, 117, 135, 139, 137

(56) References Cited

U.S. PATENT DOCUMENTS

| | | | | |
|---|---|---|---|---|
| 4,860,284 A | * | 8/1989 | Brown et al. | 370/452 |
| 4,941,084 A | * | 7/1990 | Terada et al. | 709/104 |
| 4,970,717 A | * | 11/1990 | Haas | 370/249 |
| 5,043,938 A | * | 8/1991 | Ebersole | 709/250 |
| 5,062,035 A | * | 10/1991 | Tanimoto et al. | 710/58 |
| 5,070,501 A | * | 12/1991 | Shimizu | 370/455 |
| 5,245,616 A | * | 9/1993 | Olson | 714/748 |
| 5,606,551 A | * | 2/1997 | Kartalopoulos | 370/406 |
| 5,631,906 A | * | 5/1997 | Liu | 370/455 |
| 5,734,486 A | * | 3/1998 | Guillemot et al. | 359/139 |
| 5,740,159 A | * | 4/1998 | Ahmad et al. | 370/249 |
| 5,781,537 A | * | 7/1998 | Ramaswami et al. | 370/254 |
| 5,815,667 A | * | 9/1998 | Chien et al. | 709/232 |
| 5,889,963 A | * | 3/1999 | Gopal et al. | 709/228 |
| 5,900,957 A | * | 5/1999 | Van Der Tol | 359/139 |
| 5,912,753 A | * | 6/1999 | Cotter et al. | 359/137 |
| 6,076,114 A | * | 6/2000 | Wesley | 709/235 |
| 6,154,448 A | * | 11/2000 | Petersen et al. | 370/248 |
| 6,272,548 B1 | * | 8/2001 | Cotter et al. | 709/239 |

* cited by examiner

Primary Examiner—Steven H. D Nguyen
Assistant Examiner—M. Phan
(74) Attorney, Agent, or Firm—Nixon & Vanderhye PC

(57) ABSTRACT

In a communications network, which may be a broadband optical network, a packet is transmitted from a source node to a destination node on a looped signal path. A return signal, which may function as an acknowledgement of the original signal, is transmitted back to the source node from the destination node in the time slot which was occupied by the original packet.

17 Claims, 7 Drawing Sheets

METHOD AND APPARATUS FOR TRANSMITTING A RETURN SIGNAL IN A LOOP NETWORK

FIELD OF THE INVENTION

The present invention relates to a communications network and to nodes of such a network, and, in one aspect, in particular to an optical communications network using packet routing to transmit data in the optical domain at very high bit rates.

BACKGROUND OF THE INVENTION

The increasing processing power and storage capacity of computers has lead to the development of, e.g., multimedia applications that generate high bandwidth data. This in turn has lead to a need for broadband networks capable of handling the traffic generated by such applications. Desirably, such networks should be capable of handling bursty high-bandwidth data traffic virtually instantaneously on demand.

Photonic networks have been developed to meet the need for broadband data communications. However, with current technologies there is a mismatch between the capabilities of optical networks and the types of services required by users. Typically, existing optical networks use wavelength-routed circuit connections which are ill-adapted for bursty data traffic and connectionless applications. Currently, this mismatch is handled by overlaying the optical network with electronic service layers using, for example, IP (internet protocol), ATM (asynchronous transport mode), frame relay or SDH (synchronous digital hierarchy) protocols. Such approaches become increasingly inadequate as computer processing power and the associated bandwidth requirements increase still further, and as new applications are developed using, for example, intelligent agents which search and retrieve remote information, process the information and present the information to the user through rich and intelligent user interfaces.

SUMMARY OF THE INVENTION

According to a first aspect of the present invention, there is provided a method of operating an optical communications system comprising a plurality of routing nodes, each routing node being configurable to direct a received optical packet onwards via a selected one of two or more output paths, and an optical network interconnecting the plurality of routing nodes, the method comprising a) outputting an optical packet from an originating routing node onto the optical network;

b) configuring the optical network and the routing nodes to provide a looped transmission path between the originating routing node and a destination routing node;

c) receiving the optical packet at the destination routing node; and d) transmitting a return signal to the originating routing node in a time slot on the looped transmission path which was occupied by the optical packet output in step (a).

This aspect of the present invention provides a method of operating a communications network which supports packet transmission while offering good reliability and very low latency. The invention also makes efficient use of the broad bandwidth available on optical networks, and also avoids the technological problems in this context of prior art methods which require optical buffering and complex bit-level processing. Reliable communication generally requires a handshake between originating and destination nodes. The invention reduces the time taken for this handshake to essentially the round trip time between the originating and destination nodes. This is achieved with a looped signal path. The same time slot on the looped signal path is used for both the outgoing transmission of a packet and the return transmission of the acknowledgement. As well as minimising latency, this method has the further advantage that the originating node can predict precisely when the acknowledgement signal is expected, and so can glean useful information from the absence of the acknowledgement signal at the expected time. The absence of an acknowledgement signal at the expected time can trigger a transmission failure event resulting, for example, in the retransmission of the relevant packet or string of packets.

Preferably the return signal comprises one of a plurality of packets received on the looped signal path from the originating node.

In preferred implementations of the invention, the signal transmitted to the destination node comprise a string of packets and the destination node strips off the payload packets and returns on the transmission path, e.g., a header packet. The returned packet may be modified, for example by overwriting one or more bits of an acknowledgement flag. Alternatively, the destination may generate a new packet for transmission back to the originating node. The return signal is not necessarily a simple acknowlegement signal but may, for example, comprise data to be transmitted to the source node in response to a polling signal. In this case the method may include:

transmitting a polling signal from the source node to the destination node:

scheduling a process at the source node for execution at a time after the transmission of the polling signal, which time is dependent on the return trip time between the source node and the destination node;

transmitting data from the destination node to the source node in the time slot occupied by the said polling signal; and subsequently executing the said process using the said data.

Preferably the network has a mesh topology. It may be fully meshed or partially meshed or may have a hybrid topology. Preferably the network comprises a multiplicity of nodes and links, and the nodes and links are configured as a multiplicity of directed trails, each directed trail linking some only of the multiplicity of nodes and the directed trails in combination spanning every node of the network and the looped signal path comprises a closed directed trail which includes both the originating node and the destination node.

Although the present invention in its broader aspects is by no means limited to use with any one network topology nor any one routing scheme, it is particularly advantageous to combine the method of the invention with the directed trail routing method which is described and claimed in the present applicant's copending international application, also entitled "Communications Network", WO 98/09403 Agent's reference A25265/WO. The network is then configured as a number of directed trails, and packets are routed by the originating node selecting one of the trails which spans the originating and destination nodes. No processing other than simple address recognition is then required at the intermediate nodes. The directed trail method offers low latency, good scalability and very low processing overheads. When combined with the method of the present invention, it makes it possible for the entire process of routing, receiving and acknowledging to be carried out at very high speeds.

According to a second aspect of the present invention, there is provided a method of operating a node in a communications network comprising (a) receiving a packet from a looped signal path; and (b) outputting a return signal onto the looped signal path, in the time slot originally occupied by the said packet.

According to a third aspect of the present invention, there is provided a node suitable for connection in a communications network and comprising:

a) an output arranged to output a packet onto a looped signal path for transmission to another node;

b) an input arranged to receive any signal returned by the other node on the looped signal path;

c) a node controller arranged to monitor signals returned to the said input.

According to a fourth aspect of the present invention, there is provided a method of operating a node in a communications network, the method comprising:

transmitting a polling signal from the source node to the destination node:

scheduling a process at the source node for execution at a time after the transmission of the polling signal, which time is dependent on the return trip time between the source node and the destination node;

transmitting data from the destination node to the source node in the time slot occupied by the said polling signal; and subsequently executing the said process using the said data.

In this fourth aspect the network may be an optical network but may alternatively use some other transmission medium, e.g. a wired electrical network or a wireless network.

The invention also encompasses a communications network incorporating a node in accordance with the third or fourth aspects of the invention.

BRIEF DESCRIPTION OF THE DRAWINGS

Systems embodying the present invention will now be described in further detail, by way of example only, with reference to the accompanying drawings in which.

DETAILED DESCRIPTION OF THE INVENTION

Figure 6:
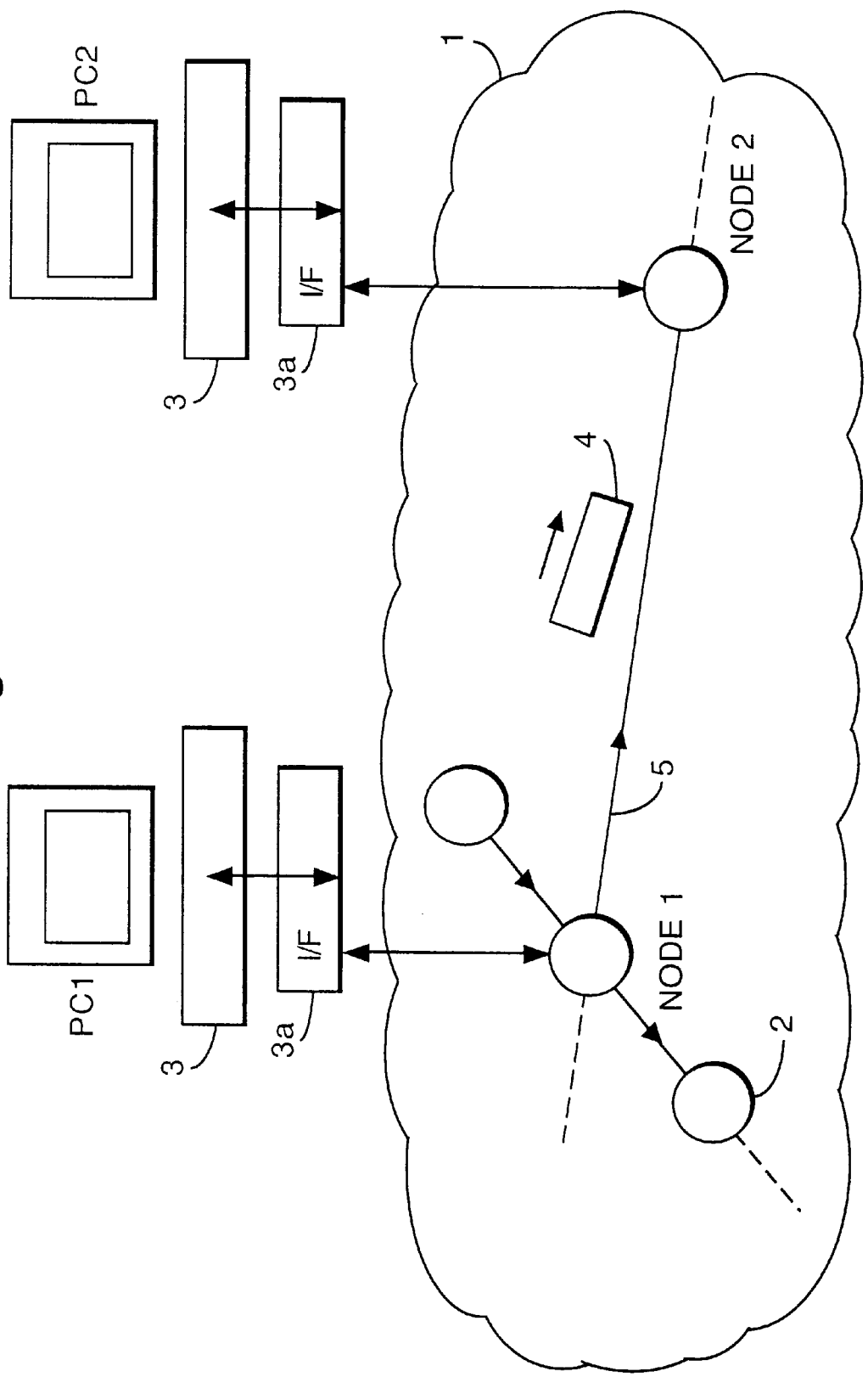
FIG. 6 shows a computer network embodying the present invention.

As illustrated in FIG. 6, an optical communications network comprises a LAN (Local Area Network) 1 linking a number of personal computer workstations 3. Each workstation is connected to the LAN via a network interface 3a. The workstations and LAN together provide a distributed computing environment that may be used, for example, for the visualisation of complex data. Each workstation is connected to a respective node 2 of the network. Packets of data 4 are communicated between the workstations 3 via the nodes 2 and links 5. In this example, the links 5 are formed from optical fibre and transmit the packets 4 in the optical domain. Although, for ease of illustration, only a few nodes are shown in the Figure, in practice, the network may comprise many hundreds of nodes. Also, although in this example the network is a LAN, the invention is equally applicable, for example, to Metropolitan Area Networks (MAN's) or to a global network such as the Internet, or to national or international telecommunications networks. The network operates in a connection-less manner. Unlike networks in which a circuit is established prior to the transmission of data, in the present network a source node outputs data addressed to the destination as soon as network resources become available, without having to go through a stage of preparatory signalling between the source and destination. The data is output as a very high bit rate optical packet, for example at 100 Gbit/s. Some amount of signalling is desirable after the message has been received by the destination, for example to allow the receiving node to notify the source that the message has been received. Conventionally, such signalling has introduced a further delay if the node receiving the message must then wait until further network resources become available before being able to send its acknowledgement signal. The present example eliminates this delay by adopting a form of signalling termed by the inventor "on-the-fly" signalling. As is further described below, signalling then takes place in the shortest possible time—limited only by the physical time of flight of the signals along the transmission path.

Figure 2:
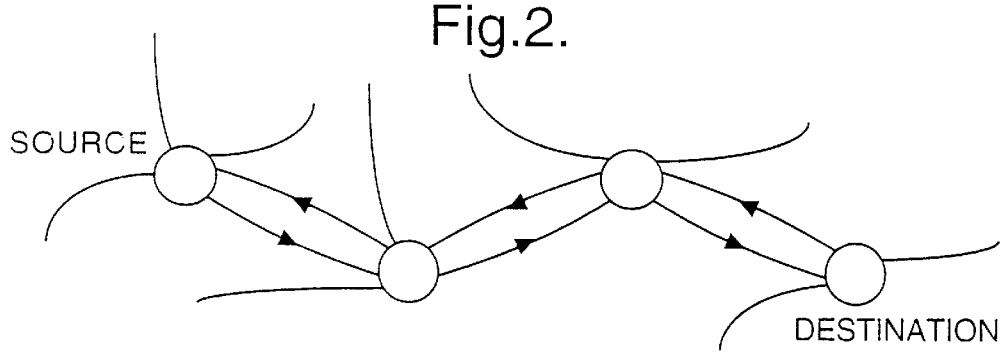
FIG. 2 is a diagram showing a network including bidirectional links.
Figure 3:
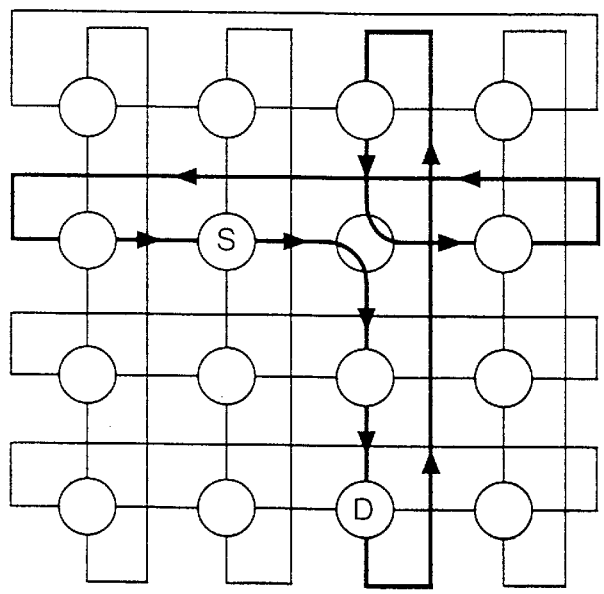
FIG. 3 is a diagram showing a Manhattan-Street network using directed trail routing.

The scheme adopted in these examples uses a continuous, unidirectional transmission path leading from the source to the destination and back again to the source. An example, shown in FIG. 2, is a network containing bi-directional links. A third example, shown in FIG. 3, is a Manhattan-Street network using the 'trail routing' technique described in the present applicant's above-cited International Patent Application. Protocols implementing the invention and suitable for use on such networks are described in detail below. In these examples it is assumed here that equipment failures are rare occurrences, which are detected and remedied by higher-layer protocols. The routing protocol described here is concerned with providing ultra-low latency signalling in the normal case, where such failures do not occur. It is also assumed that a transmitted message consists of a single packet or a string of packets, and that the packets are inserted into fixed-length time slots each of which can contain at most one packet.

In the protocols described here, when a source node wishes to start transmitting a message to a destination node it must wait until there is vacant capacity on the transmission path (i.e. in a slotted system, until there is at least one free time slot). When the destination node receives the message and wishes to return an acknowledgement or similar signal to the source, it does this by transmitting the signal in all or part of the time period occupied by the original message (i.e. in the slotted system, by using one or more of the time slots used by the source to transmit the original message). This has the advantage that the destination node does not need to wait until there is further vacant capacity on the transmission path before the packet can be sent, because it is immediately reusing a time slot already reserved by the source. This ensures that the signal is transmitted by the original message destination and received by the original message source in the shortest possible time, limited by the transmission time of flight at the speed of light. The destination node does not need to wait until there is further vacant capacity on the transmission path before the signal can be sent. By a suitable choice of protocol and packet format, the signal returned from the destination node to the original source can consist of one or more of the original message packets (optionally with some modification, such as a changed flag, or even with no modification at all). Then the processing required by the destination node to generate the acknowledgement is primitive and minimal. In this way the destination node can make its signalling decisions at high speed whilst the packet is 'on the fly', without the need for buffering.

A further aspect of the protocols is that the round-trip time-of-flight of a packet from a source to destination and back again can be accurately known, since it corresponds to a physical distance only. Therefore at the instant when a source transmits a packet it knows precisely when to expect a response. The source may use the time of arrival of a signal packet to identify the message and destination with which it is associated. Also, if a signal fails to arrive at the expected time, the source can interpret this absence of a signal in various ways (for example, as illustrated below, to indicate that a message failed to reach its intended destination).

Discourteous Protocol

Figure 1:
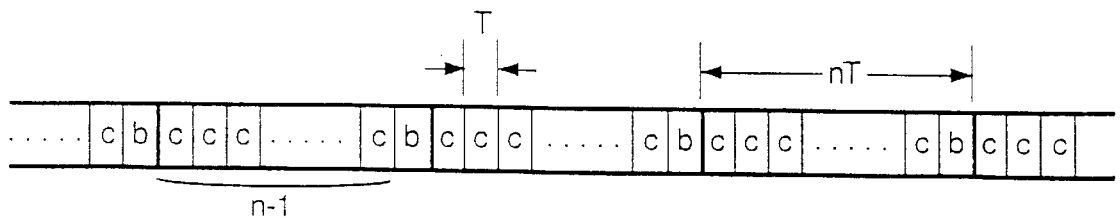
FIG. 1 is a timing diagram showing packet slots.
Figure 7:
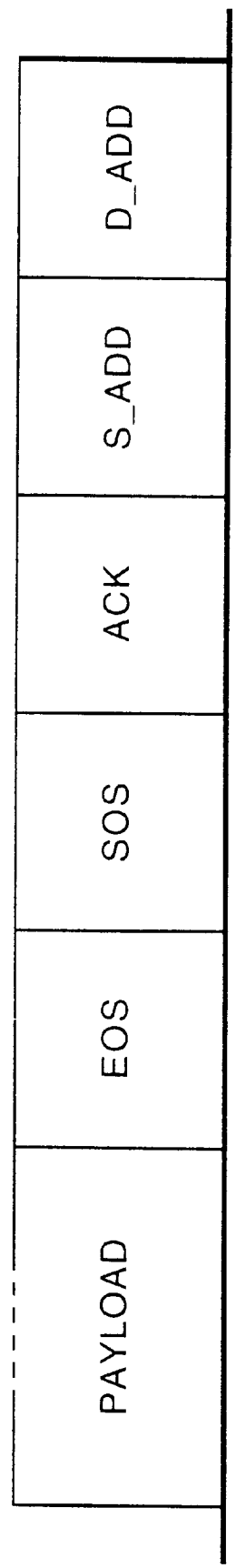
FIG. 7 is a diagram showing the format of a packet transmitted in a network embodying the invention.

This first protocol is termed 'discourteous' since intermediate nodes in the network are allowed to discard packets from other nodes. In this protocol, as shown in FIG. 7, each packet includes the following fields: destination address, source address, ACK (acknowledgement) binary flag, SOS (start of string) binary flag, EOS (end of string) binary flag, and payload data including higher-layer protocol data fields. On transmission by the source, ACK=0 for all packets in the string. The first packet of a string is denoted by SOS=1. A packet, neither the first nor the last, in a string of 2 or more packets is denoted by SOS=0 and EOS=0. The final packet of a string of 2 or more packets is denoted by SOS=0 and EOS=1. A string consisting of a single packet is denoted by SOS=1 and EOS=1. The source node, wishing to transmit a string of packets to a destination node, must wait until there is at least one free time slot on a transmission path leading to the destination. In the case of the unidirectional ring network, FIG. 1, any free time slot may be used since the transmission path always leads to the destination. In the case of the Manhattan-Street network using the 'trail routing' technique described in our copending international application, the source must wait for a free time slot in the correct position in the frame to provide a transmission path to the destination. The source will then begin transmission with the first packet inserted in the first free time slot. If the string consists of two or more packets, the source will continue to transmit to the destination node using the sequence of subsequent appropriate time slots, regardless of whether they are vacant or not. Once the source node has commenced transmission of its own string of packets, it is free to discard any foreign string of packets (i.e. a string not addressed to the source node itself) that arrives in time slots it wishes to use. Once the source has begun discarding a foreign string of packets, it must discard the whole of the string (the end of which is denoted by the flag EOS=1). The exception to this rule is that no node may discard a packet that carries the flag ACK=1, unless the source address field in the packet corresponds to the address of the node itself. The protocol may contain a definition for the maximum length of any string of packets, to prevent a node from capturing unfairly the network resources.

In this discourteous protocol, the string of packets transmitted by the source may not succeed in reaching the destination node because it may be discarded en route by other nodes that have already begun transmitting. Should the string of packets successfully reach its destination, the destination node must immediately acknowledge this by sending a signal back to the source. This may be done by allowing the first packet in the string (SOS=1) to continue along its path back to the source. This packet is unmodified by the destination node, except that the ACK flag is set to 1. The destination node must remove all other parts of the string from the network (except, as described below, the last packet in the string). The source that originated the string recognises that the ACK signal is directed to itself because it sees its own address as the source address in the packet. If the acknowledgement signal is not received by the source at a time equal to the round-trip propagation time of the transmission path from the source back to the source via the destination, then the source may assume the string of packets was discarded en route, and so will know it should immediately retransmit the string.

A further acknowledgement is sent by the destination node back to the string source to indicate that the whole string of packets has been delivered successfully. Examples of reasons for unsuccessful delivery are transmission errors and overflow of the receiver buffer. The type of transmission errors that can be detected in an 'on-the-fly' network is dependent on the bit rate and the technology used to implement the network. At very high speeds (=100 Gbit/s), rather than carrying out full bit-error detection for the entire string of packets, simplified error detection might be used. This may include the detection of missing packets or grossly corrupted packets. Assuming the string is deemed to have been delivered successfully, a similar signalling technique can be used for the second acknowledgement. This is done by allowing the final packet in the string (EOS=1) to continue along its path back to the source. This packet is unmodified by the destination node, except that the ACK flag is set to 1. Again, if the second acknowledgement signal is not received by the source at the expected time, then the source may assume the string delivery was unsuccessful. The absence of the acknowledgement signal triggers a transmission failure state at the source, resulting in immediate retransmission of the string of packets. In a network large enough that the propagation round-trip time is long compared to the maximum string length, there may not be a significant advantage in sending the first ACK signal (corresponding to the SOS=1 packet in the string); it may be sufficient for the destination to return only one ACK signal (corresponding to the EOS=1 packet).

Rules for implementing the protocol are summarised in the following logical description for the action of any node (address N) in response to an incoming packet P.

if destination address of P=N then
{incoming string received}
begin
  pass contents of P to receiver buffer;
  if (SOS=1 in P) or (EOS=1 in P and message received error-free) then
  set ACK=1 in P and allow P to continue along path
  else remove P from network;
end;
if ACK=1 in P and source address of P=N then
{acknowledgement signal received} begin
   pass contents of P to signalling receiver buffer;
   remove P from network;
end;
if (node N is transmitting) and not (ACK=1 in P and source address in P<>N) then
{be discourteous}
   remove from network all incoming packets up to and including EOS=1.

Figure 4:
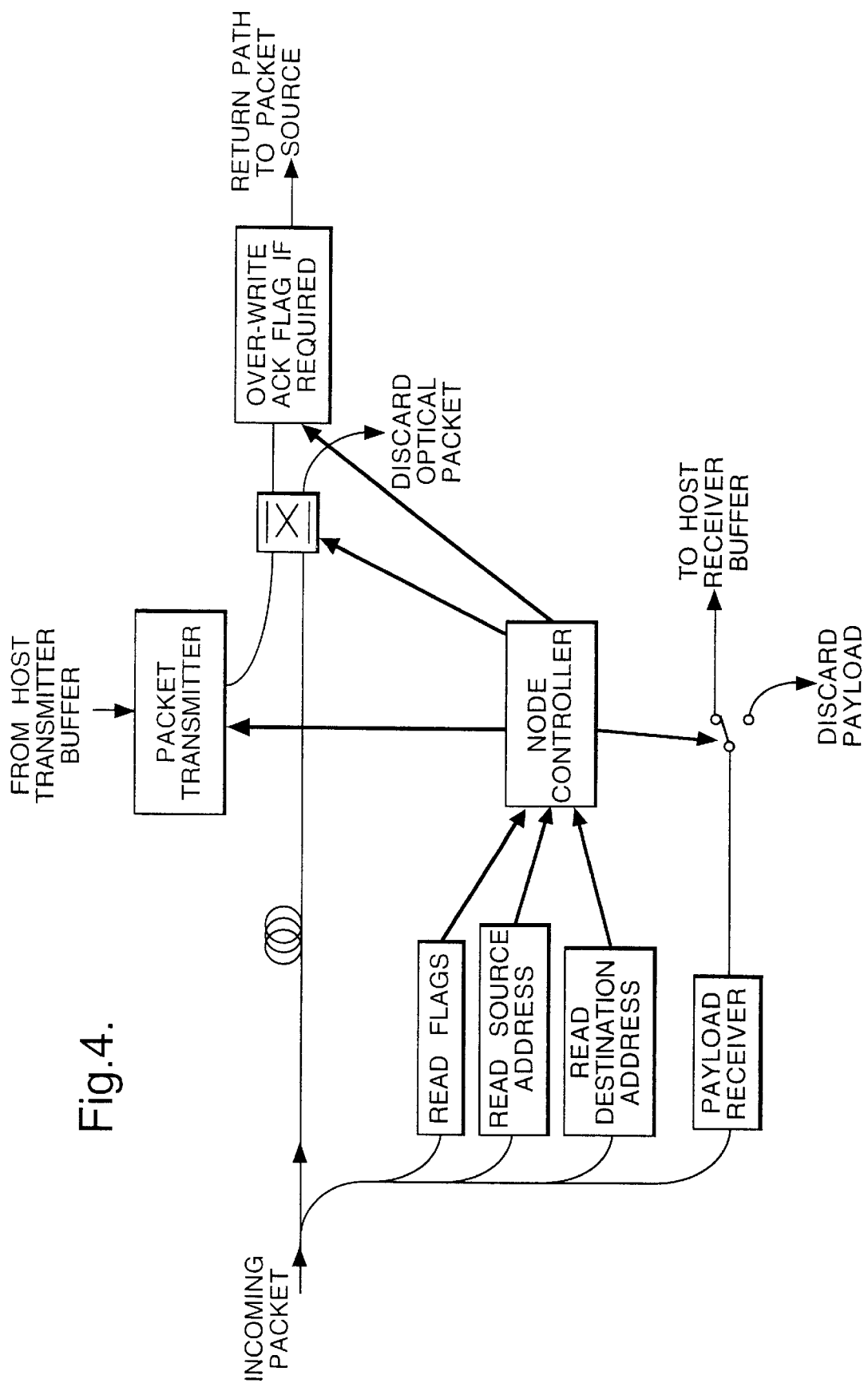
FIG. 4 is a block diagram showing the functional components of a node for use in implementing the invention.

The 'discourteous' protocol is very simple. The logic required is sufficiently simple that it can be executed at high speed in electronic hardware using a fast decoder circuit. The amount of optical processing is small: the destination node is required to change a single binary flag in one or two packets of each string. FIG. 4 shows an example block layout of a node.

The 'discourteous' protocol performs well when the network is not heavily loaded. However, as the loading increases there is an increasing probability that a string of packets will be discarded before it reaches its destination, so no ACK is received by the source, and therefore the source node will retransmit the string automatically. This effect is accumulative until many nodes are continually retransmitting and almost no strings are delivered.

'Courteous' Protocol

The performance limitation of the 'discourteous' protocol under heavy loading is removed by using a 'courteous' protocol, in which packets are not discarded whilst en route to their destinations. Once a string of packets has been transmitted by the source its arrival at the destination is guaranteed (at least at the level considered by the protocol, since we neglect here the rare occurrence of equipment failure). Contention does not occur within the network; contention resolution is performed only at the edge of the network by the transmitting nodes (by using only vacant time slots). In this case, when a node N is transmitting on a given channel and a foreign string of packets, not addressed to N, arrives on the same channel, the node N must cease transmission and allow the foreign string to proceed uninterrupted. There are two strategies that can then be adopted to deal with this occurrence. In the first strategy, node N will restart the transmission of its string from the beginning again as soon as a vacant time slot becomes available. In the second strategy, node N will restart the transmission of its string from the point at which it was interrupted as soon as a vacant time slot becomes available. In that case the packet should contain a further flag COS (continuation of string). Optionally, a maximum length of any string of packets may be specified, to prevent a node from capturing unfairly the network resources.

When the destination node begins to receive a string of packets it immediately acknowledges this by sending a signal back to the source. In the case of the discourteous protocol, this was necessary to indicate that the string had successfully reached the destination. In the courteous protocol, the arrival of the string is guaranteed. Nevertheless the destination node needs to signal to the source that it is ready and has the resources available to receive the message. If the destination node is not able to receive the message, the source should be informed as soon as possible to cease transmission. If the destination node wishes to send an acknowledgement signal to the source indicating that it has the resources available to receive the message, it may do this by allowing the first packet in the string (SOS=1) to continue along its path back to the source. This packet is unmodified by the destination node, and it continues onwards back to the source node where it functions as an acknowledgement signal. The destination node must remove all other parts of the string from the network (except, as described below, the last packet in the string). The source that originated the string recognises that the acknowledgement signal is directed to itself because it sees its own address as the source address in the packet. If the acknowledgement signal is not received by the source at a time equal to the round-trip propagation time of the transmission path from the source back to the source via the destination, then the source may assume the destination node is not able to receive the message, and so the source will know it should immediately cease transmission.

A further acknowledgement is sent by the destination node back to the string source to indicate that the whole string of packets has been delivered successfully. As in the case of the 'discourteous' protocol, examples of reasons for unsuccessful delivery are transmission errors and overflow of the receiver buffer. Again, assuming the string is deemed to have been delivered successfully, the second acknowledgement can be made by allowing the final packet in the string (EOS=1) to continue along its path back to the source. This packet is unmodified by the destination node and it continues onwards back to the source node as an acknowledgement signal. Again, if the second acknowledgement signal is not received by the source at the expected time, then the source may assume the string delivery was unsuccessful, and so will know it should immediately retransmit the string of packets.

The 'courteous' protocol rules for the action of any node (address N) in response to an incoming packet P are as follows.

if destination address of P=N then
{incoming string received}
if node N has the resources available to receive the incoming string then
begin
   pass contents of P to receiver buffer;
   if (SOS=1 in P) or (EOS=1 in P and message received error-free) then
   allow P to continue along path
   else remove P from network;
end
else remove P from network;
if source address of P=N then
{acknowledgement signal received}
begin
   pass contents of P to signalling receiver buffer;
   remove P from network;
end;
if (node N is transmitting) then
{be courteous}
begin
   allow P to continue along path;
   either {depending on strategy used}
   recommence transmission (with SOS=1 in first packet) when free time slot obtained
   or
   continue transmission (with COs=1 in first packet) when free time slot obtained;
end.

The protocols described in the above examples may be used with a variety of different packet routing methods, and in networks of different topologies, provided that the network is configurable to provide a looped transmission path.

In the present examples however a directed trail routing method is used. This takes advantage of the fact that a network having a topology of the type exemplified below, can be divided into a set of distinct trails, such that no one single trail spans all of the network, but there is always one trail which leads from a given source node to a given destination node. Routing can then be carried out simply by selecting the appropriate trail linking a source node to the desired destination node. Once on the trail, the packet can be routed in a quasi-one-dimensional fashion. As in one-dimensional routing the source node selects the entire trail from the source to the destination before sending the packet. It is found that a particularly effective way of routing a packet along a trail formed from a number of directed cycles is to switch the optical output of the intermediate nodes at rescheduled times e.g. with a fixed periodicity, so as to connect one cycle to another cycle. The source node then determines the trail followed by the packet by outputting the packet at a time determined in relation to the switching schedule so that, at a desired node, it is switched from one cycle to the next cycle in the trail. Preferably the switching occurs at a point of connection between cycles from a link-disjoint directed-cycle decomposition of the network. Preferably the nodes switch in synchronism throughout the network between pre-scheduled predetermined switching states. For example, in the 4×4 torus network described below, a crossbar switch is associated with each node. All the crossbar switches are normally set to the cross state and repeatedly, at predetermined intervals, the crossbar switches are set to the bar state.

Figure 8:
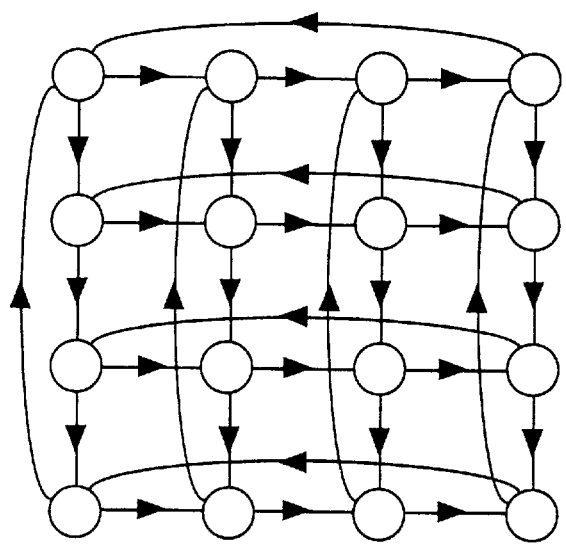
FIG. 8 is a diagram showing a torus network.
Figure 9A:
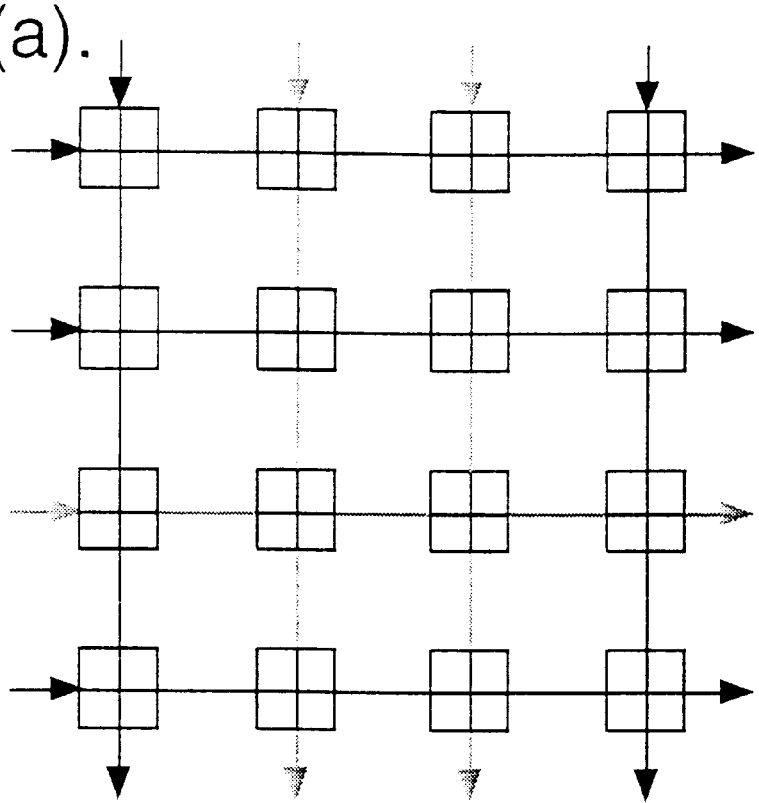
FIGS. 9a and 9b show switch states in a torus network.
Figure 9B:
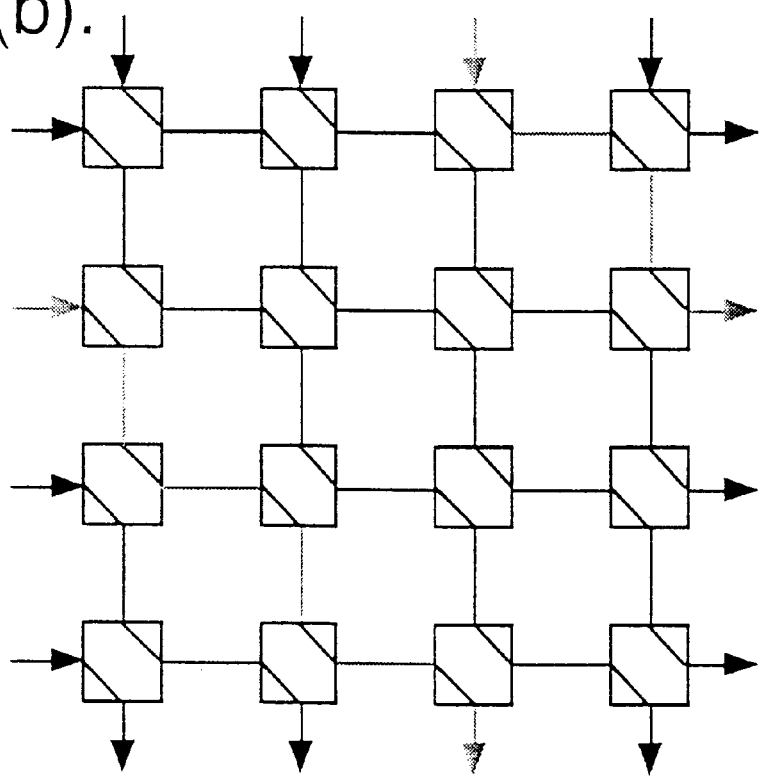

This routing method will now be described with reference to FIGS. 3 and 8 to 10. In the network of FIG. 8, nodes and interconnecting fibres are configured as an n×n torus network. The n×n torus network is a regular network with unidirectional links, and the nodes have indegree and outdegree of 2. Logically, the links form a grid on the surface of a torus, and all the links in the n rows or n columns are codirectional. An example of a 4×4 network is shown in FIG. 8. Each node contains a 2×2 'crossbar' switch or its logical equivalent. In the cross configuration the switch connects the input column to the output column, and the input row to the output row; in the bar configuration the input column is connected to the output row, and the input row is connected to the output column. FIG. 9(a) shows the situation in which all switches are set to the cross position. In that case, the network consists of a set of 2n cycles, each of length n. In the notation here, the n horizontal cycles are denoted $C_{ih}$ where i=0,1, . . . ,n−1, and the n vertical cycles are denoted $C_{jv}$ where j=0,1, . . . , n−1. This link-disjoint directed-cycle decomposition of the network graph is well suited to the directed trial routing method. The n×n torus network contains $n^2$ distinct closed directed trails, defined as $T_{ij}=C_{ih} \cup C_{jv}$, with i,j=0,1, . . . ,n−1. The cut point of trail $T_{ij}$ occurs at the intersection of the component cycles, at the node ($i_{ij}$); in other words, each of the $n^2$ nodes in the network is the cut-point of exactly one of the closed directed trails $T_{ij}$. This cycle-decomposition of the network is well suited to the directed-trail routing method, because a packet can be routed from its source to its destination, both located anywhere in the network, along a directed trail consisting of a vertical or horizontal cycle or the union of one vertical and one horizontal cycle; therefore the packet must be switched between cycles a maximum of once (at the cut-point which is the point of connection between the vertical and horizontal cycles). A different cycle-decomposition of the network is obtained when all the switches are set to the bar position, as shown in FIG. 9(b); in that case the network consists of n cycles, each of length 2n. However this cycle decomposition is less well suited to directed-trail routing because a directed trail leading between a source-destination pair may, necessarily, be the union of many cycles.

The switching operations that maintain a packet on its selected trail leading from its source to its destination can operate in an automatic fashion, without requiring the intermediate nodes to interrogate the packet destination address or to perform any intelligent route selection. The network operates in a slotted fashion with packets constrained to some maximum length, i.e. time is divided into a regular time slots which are dimensioned to contain a packet of the maximum allowable size together with a guard band. The crossbar switches in all the routing nodes in the network are arranged to operate in a regular, coherent fashion, locked to a global network clock at the time-slot rate. When the switches change configuration they do so during the guard band so as not to corrupt packets. FIG. 9 is a time diagram showing the packet time slots, each of length T, arranged in frames of length n time slots. In the first n−1 time slots in a frame, the crossbar switches are all set in the cross position (denoted c in the diagram); in the final time slot of the frame the switches are all set to the bar position (denoted b). The length of each link connecting a pair of adjacent nodes in the network is selected and controlled so that the signal group time-of-flight is equal to (qn+1−Δ)T, where q is any integer, and Δ is the phase difference between the clock signals at the two nodes, expressed as a fraction of the time slot period T. In other words, apart from the clock phase difference ΔT, the length of every link in the network is equal to an arbitrary integer number of frames plus one time slot. Thus a packet which exits from a node in the jth time slot of a frame will arrive at the next node in the (j+1)th time slot of a frame. More generally, the packet may be advanced or retarded by a fixed integer number of time slots. The packet may be advanced/retarded by any fixed integer number of slots which is not a multiple of n, if n is odd, or by a number which is odd if n is even.

Figure 10:
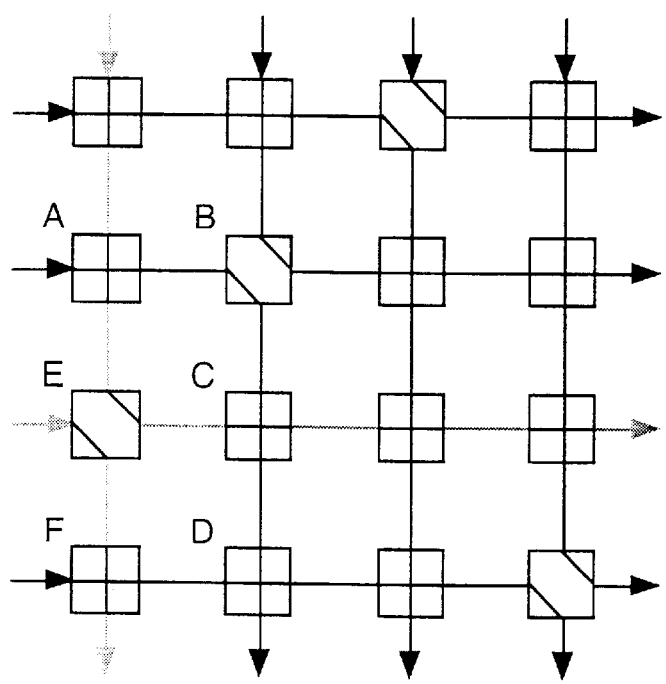
FIG. 10 shows in further detail switch states in a torus network.

FIG. 10 shows how a 4×4 torus network might appear to some of the packets travelling inside it. Suppose, in FIG. 10, node A wishes to transmit a packet to node D. The source node A will use a look-up table or some other algorithm to determine that it should transmit the packet along the outward link in the horizontal cycle $C_{2h}$ using a vacant time slot in the third position in a frame (in this example each frame contains 4 slots). On arrival at the next node, B, the packet will find itself in the fourth (i.e. the last) slot in a frame, and therefore the crossbar switch at B will be configured in the bar position, as shown in FIG. 10. The packet is therefore switched into the vertical cycle $C_{1v}$ and progresses onwards through node C (where it is now in the first time slot of a frame, so the switch at C is in the cross state), eventually reaching its destination node D. Not shown in FIG. 10 is an alternative routing; exiting from A along the vertical cycle $C_{0v}$ in the second time slot of a frame, via nodes E and F.

In the torus network, directed-trail routing using the trails $T_{ij}=C_{ih} \cup C_{jv}$ is 100% efficient; i.e. the directed-trail routing gives the shortest path between any source-destination pair. It can be shown that the average shortest-path distance in the n×n torus network is equal to $n^2/(n+1)$ hops. Since the maximum steady-state throughput is given by the indegree of the nodes divided by the average distance taken, it is equal to $2(n+1)/n^2$. Therefore the throughput scales as O(1/√N), where $N=n^2$ is the number of nodes, in contrast with one-directional routing where the throughput scales as O(1/N).

As indicated earlier, with directed-trail routing, the only processing operation connected with the routing that a network node is required to perform on incoming packets is simple: the destination address of every incoming packet is examined, and if it corresponds to the address of the node the packet is removed from the network, otherwise it is forwarded. The process of comparing the packet address and the node address is a simple single-word matching operation, and can be performed at high speed; for example, optical recognition of 6-bit address words has been demonstrated recently at a peak rate of 100 Gbit/s [Cotter, D., Lucek, J. K., Shabeer, M., Smith, K., Rogers, D. C., Nesset, D. and Gunning, P.: 'Self-Routing of 100 Gbit/s Packets Using 6-Bit 'Keyword' Address Recognition', *Electronics Letters*, 31, pp. 2201–2202 (1995)]. Since the directed-trail routing does not use an algorithm that relies on any particular sequential numbering system for the network nodes, the nodes can be labelled in an entirely arbitrary fashion. This can simplify the tasks of planning, administrating and evolving the network.

Although the description of directed-trail routing in the torus network has assumed, until now, that the network is a complete n×n structure, it is also possible to cope with the situation where a node is missing or a node or link fails. If a node is missing, it is necessary only that the links that bypass this vacant position maintain the correct timing relationship, i.e. in this case the link that bypasses a vacant node position should have a signal group delay of $(qn+2-\Delta)T$ (an integer number of frames plus two time slots minus the phase correction $\Delta T$). Unlike one-dimensional routing methods, the operation of the entire network is not jeopardised by the loss of a link or node. This is because there are two available directed-trail routes between any source-destination pair, provided the source and destination are not located in the same horizontal or vertical cycle. If one directed trail fails, the other available trail can be used instead. If the source and destination are located on the same vertical or horizontal cycle there is no alternative directed-trail routing, but the cycle can be healed by bypassing the defective node or link in the manner just described in the case of a missing node.

Neither is it strictly necessary for the torus network to be square; for example, directed-trail routing can be used in a rectangular network with m rows and n columns, where m>n, say. Then the frame must contain the number of time slots corresponding to the greater dimension (m in this case), and there are m−n missing, or 'phantom', columns in a complete m×m structure. Packets travelling along a row in a time slot corresponding to a phantom cut-point can remain only within the row. This reduces the network efficiency, but ensures that all the mn real nodes can be accessed.

FIG. 3 shows a Manhattan Street network (MSN). The n×n MSN is a regular network with unidirectional links, and the nodes have indegree and outdegree of 2. Logically, the links form a grid on the surface of a torus. The MSN differs from the torus network in that the links in adjacent rows or columns travel in opposite directions, and the MSN is defined only in the case that the numbers of rows and columns are even. The routing scheme for the MSN using directed trails $T_{ij}=C_{ih} \cup C_{jv}$ is closely similar to the torus network; the main difference is that alternate horizontal or vertical cycles have opposite orientation. Unlike in the torus network, the relative routing efficiency of directed-trail routing in the MSN (compared to shortest-path routing) is less than 100%. However, the average shortest-path distance in the MSN is less than in the torus network of equal size (approaching a factor of 2 shorter for large networks). The shortest directed-trail distances between source-destination pairs in the MSN depends on the relative orientations of the inward and outward links at the nodes, and the formulae are set out in Table 1. Using these formulae, the relative routing efficiency (relative to shortest-path routing) can be calculated. These show that directed-trail routing in the MSN, although less efficient than a shortest-path algorithm such as Maxemchuk's 'first rule' (Maxemchuk, N. F.: 'Routing in the Manhattan Street Network', *IEEE Transactions on Communications*, 35, pp. 503–512 (1987)) or the dead-reckoning method described in the present applicant's international patent application PCT/GB 96/01823, is still good. In particular, the routing efficiency for directed-trail routing in large MSNs is around 0.65.

TABLE 1

Shortest directed-trail distances between source-destination pairs in the n × n MSN. For the purposes of these formulae only, the rows and columns are each numbered sequentially 0, 1, . . . , n − 1. Even numbered rows are oriented towards the 'right'; odd numbered rows are oriented towards the 'left'. Even numbered columns are oriented in the 'down' direction; odd numbered columns are oriented in the 'up ' direction. The source is located at the intersection of row sr and column sc; similarly the destination is located at the intersection of row dr and column dc. If, for example, sr is even and sc is odd, the source node orientation is called 'up and right'.

| Source node orientation | Destination node orientation | Shortest directed-trail distances (the lesser if two expressions are given) |
|---|---|---|
| down and right | down and right | (dr-sr) mod n + (dc-sc) mod n |
| | down and left | (dr-sr) mod n + (dc-sc) mod n |
| | | n − (dc-sc) mod n + (dr-sr) mod n |
| | up and left | (dc-sc) mod n + n − (dr-sr) mod n |
| | | n − (dc-sc) mod n + (dr-sr) mod n |
| | up and right | (dc-sc) mod n + n − (dr-sr) mod n |
| | | (dc-sc) mod n + (dr-sr) mod n |
| down and left | down and right | (dc-sc) mod n + (dr-sr) mod n |
| | | n − (dc-sc) mod n + (dr-sr) mod n |
| | down and left | (dc-sc) mod n + (dr-sr) mod n |
| | up and left | (dc-sc) mod n + n − (dr-sr) mod n |
| | | (dc-sc) mod n + (dr-sr) mod n |
| | up and right | (dc-sc) mod n + n − (dr-sr) mod n |
| | | n − (dc-sc) mod n + (dr-sr) mod n |
| up and left | down and right | (dc-sc) mod n + n − (dr-sr) mod n |
| | | n − (dc-sc) mod n + (dr-sr) mod n |
| | down and left | (dc-sc) mod n + n − (dr-sr) mod n |
| | | (dc-sc) mod n + (dr-sr) mod n |
| | up and left | (dc-sc) mod n + (dr-sr) mod n |
| | up and right | (dc-sc) mod n + (dr-sr) mod n |
| | | n − (dc-sc) mod n + (dr-sr) mod n |
| up and right | down and right | (dc-sc) mod n + n − (dr-sr) mod n |
| | | (dc-sc) mod n + (dr-sr) mod n |
| | down and left | (dc-sc) mod n + n − (dr-sr) mod n |
| | | n − (dc-sc) mod n + (dr-sr) mod n |
| | up and left | (dc-sc) mod n + (dr-sr) mod n |
| | | n − (dc-sc) mod n + (dr-sr) mod n |
| | up and right | (dc-sc) mod n + (dr-sr) mod n |

Figure 5:
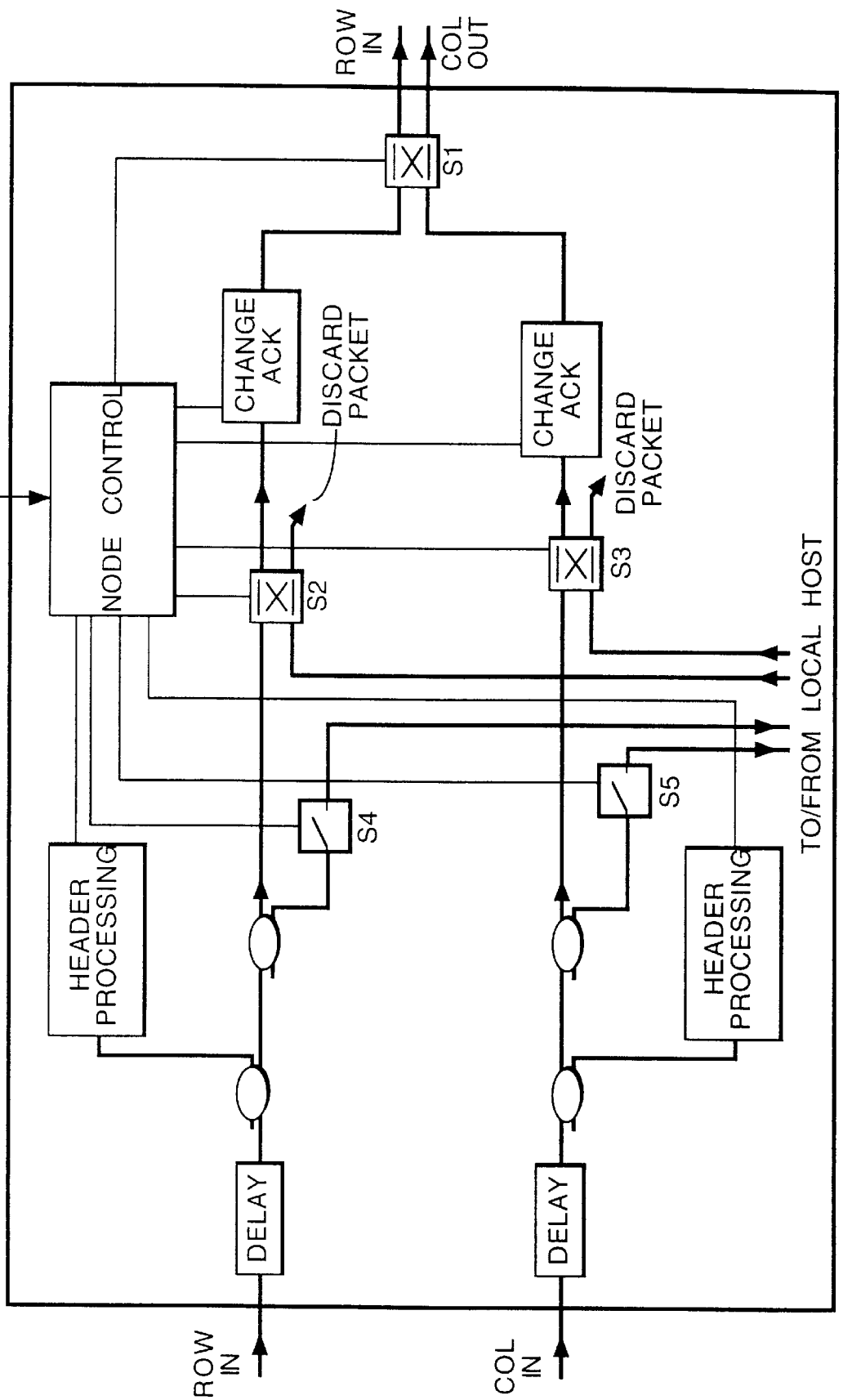
FIG. 5 is a diagram showing a possible configuration for components used to implement the node of FIG. 4.

FIG. 4 is a block diagram showing the elements of the node needed to implement the acknowledgement protocols, and FIG. 5 shows the components used to implement this in conjunction with a directed trail routing method. FIG. 5 shows the structure of a 2-connected node suitable for insertion in the MSN shown in FIG. 3. In a photonic network implementation, the heavy lines shown in FIG. 3 are optical fibre paths. The delay units at the two inputs to the node provide the necessary adjustment on the lengths of the two incoming links to satisfy the requirement described earlier, that on each link connecting a pair of nodes, the signal group time-of-flight along the link should be equal to $(qn+1-\Delta)T$, where q is any integer, and $\Delta$ is the phase difference between the clock signals at the two nodes, expressed as a fraction of the time slot period T. By providing two delay lines (one on each input) with independent compensation for phase differences, it is also possible to ensure that the packets on the two incoming links are correctly synchronised relative to each other and to the time-slot clock at the node. Each delay unit could consist of a combination of: i) a length of fibre cut to a suitable length to provide coarse timing adjustment; ii) a step-adjustable delay line consisting of a chain of 2×2 space switches and fibre delays to provide timing adjustment to within a few hundred picoseconds; and iii) a free-space adjustable optical delay line (such as optical delay line type ODL-300-15-SMF manufactured by Santec Corporation) to provide fine adjustment to within a few tens of picoseconds. It may be necessary also to compensate for slow drifts in the optical path length of the incoming links. These drifts may be caused by environmental factor acting on the fibre—for example, movement causing stretch, or temperature variations. This continuous environmental compensation can be achieved by detecting a variation in the relative timing of incoming packet arrivals and the time-slot clock at the node, and providing an electrical feedback control signal to the step-adjustable delay line and the free-space adjustable delay line units.

The header-processing units performs the following tasks: i) detects the presence or absence of a packet in a time slot; ii) detects the time of arrival of a packet; iii) determines whether or not an incoming packet is addressed to the node; and iv) reads header flags such as the ACK flag. For tasks i) and ii) it is sufficient to use a ~1 GHz-bandwidth photodetector to detect a fraction of the packet signal. The presence of a signal from this photodetector during the time slot indicates the presence of a packet. The phase relationship between the time-slot clock and the component of this photodetector signal which is at the time-slot rate can be detected using an electronic phase detection circuit, and a voltage proportional to this phase difference provides the control signal necessary for the feedback control circuit mentioned above. For task iii) it is necessary to compare the address in the packet header with the address of the node. For an ultrafast photonic implementation this can be performed using the method of ultrafast binary word recognition described in the present applicant's international patent application PCT/GB94/00397, with further technical details disclosed in WO 95/33324. The contents of these earlier applications are incorporated herein by reference. An experimental demonstration of this technique is described in the above-cited paper by Cotter et al. As described in the above-cited applications, address words for packets are selected from the subsets of binary words for which the following condition is true for any two words A, B in the subset:

$A \otimes B = 0$ only if $A=B$, and $A \otimes B = 1$ otherwise, where $A \otimes B$ is the Boolean operation $$\sum_{i=1}^{n} a_i \cdot \bar{b}_i.$$

Word recognition is then carried out using a simple AND operation between an address word from a packet and the complement of the node address. A suitable AND gate is a semiconductor optical amplifier supporting four-wave mixing (FWM).

This method of word recognition provides a binary output signal indicating whether or not the header destination address matches the node address.

The basic space-switching operation is performed by five crossbar switches. The use of five switches rather than only one firstly provides the additional signal paths needed to connect to and from a local host computer system, and secondly makes it possible for a node simultaneously to read a packet and to allow a packet to continue to travel on the looped signal path. Switches S2 and S3 provide the connections to the local host computer system and switches S4 and S5 allow a replica of an optical packet to be communicated to the local host while the original packet can continue via S2 (or S3) and S1 to an outgoing link. Suitable space switches capable of operation in a time of 1 ns or less are lithium niobate devices such as type Y-35-8772-02 supplied by GEC Advanced Components.

A node such as that described above can be used to insert a new packet from the local host at the destination node into a time slot already reserved by the source. In this example, this is done by switching S2 or S3 into the cross position. This may be done in order to transmit back an acknowledgement signal generated at the destination node, as an alternative to using part of the incoming signal as the acknowledgement signal. This mechanism may also be used to allow the source to schedule the delivery of data from the destination node back to the source, and hence also to schedule processes at the source which rely upon that data. The source and destination may initially communicate to establish a time after which the data is available, and the quantity of data. The source subsequently may transmit a pollling signal to the destination comprising a number of packets sufficient to contain the quantity of data. The destination node writes packets into the corresponding time slots, and the data subsequently arrives back at the source at a predetermined time after the transmission by the source of the number of packets.

An optical processing block is included in each of the input lines to routing switch S1. This block overwrites the ACK flag in a packet when necessary. The block may be implemented, for example, using an optical time-division add/drop multiplexer such as the photonic semiconductor integrated circuit device fabricated at the Heinrich-Hertz Institute ("Monolithically integrated asymmetric Mach-Zehnder interferometer as a robust add/drop multiplexer for OTDM systems", E. Jahn et al, Electronics Letters, vol. 32, pp. 216–217, 1996). This would be used in conjunction with a method for generating a suitable optical control signal to function as a synchronisation pulse, such as that described in International Patent Application No. WO 95/32568 filed May 23, 1995 by the present applicants (BT Case no A24884).

The network may use a time slot clock at a rate of 155 MHz (6.45 ns period). This is a standard clock used currently in SDH networks and can be distributed over wide (national) geographical regions with timing jitter of less than 500 ps. The packet may consist of 53 bytes at 100 Gbit/s (4.24 ns duration). A suitable switch band for operation of the electro-optic space switches is 1 ns, and in addition there are two time guard bands each of size 0.6 ns. Within the node, the position of the current time slot in the frame can be tracked by an electronic modulo n counter (for a frame n time slots long) which counts the time-slot clock pulses. During the initial start-up phase of the network, and subsequently when time slots are available, one node in the network (designated a master node) can broadcast packets in one fixed position in the frame (such as the first position), so that the counters in other nodes can be reset to the correct phase in synchronism with the master node.

The space switches in the node are activated by the electronic switch controller unit shown in FIG. 5 which acts on the basis of the following information: i) whether or not the position of the time slot in the frame corresponds to a 'cross' or 'bar' configuration in the directed-trail routing cycle (1 bit); ii) whether or not an incoming packet occupies the current time slot (1 bit per input port); iii) whether or not the destination address for an incoming packet matches the address of the node (1 bit per input port); iv) whether or not a packet that is waiting in the host's output buffer wishes to access an output port in the current time slot (1 bit per output port). On the basis of this information, (total 7 bits) the electronic switch controller unit sends electrical drive signals to the space switches in correct synchronism with the time guard bands between packets, and in this way performs the following tasks: i) routes incoming packets to the host or to one of the output ports; ii) routes packets from the host to one of the output ports if the required time slot is vacant. An example of the logic required to perform these tasks is as follows:

if not (current time slot is last position in frame)
  then
    S1:=cross;
if ((incoming row time slot is occupied) and not (incoming column time slot is occupied) and not (incoming row packet is addressed to host) and (a host packet is waiting to exit from the row port in the current time slot) and (a host packet is waiting to exit from the column port in the current time slot)) {comment—destination address of vacant incoming column time slot is not defined} then
begin
  S2:=cross;
  S3:=bar;
end.

The routing logic, of which this is an example, is sufficiently simple that it can be executed using hard wiring together with a fast 8-bit decoder chip, without the need for arithmetic, registers or look-up tables. It is purely a logical combination circuit, and therefore the decision time depends only on gate delays. The switch controller unit can therefore operate at high speed, suitable for routing packets in multi-Gbit/s networks. Similarly, the logic for the signalling protocols discussed above uses purely combinatorial logic and can be implemented in the same manner using hard wiring and a fast decoder chip.

What is claimed is:

1. A method of operating an optical communications system comprising a plurality of routing nodes, each routing node being configurable to direct a received optical packet onwards via a selected one of two or more output paths, and an optical network interconnecting the plurality of routing nodes, the method comprising:
   a) outputting an optical packet from an originating routing node onto the optical network;
   b) configuring the optical network and the routing nodes to provide a unidirectional looped transmission path from the originating routing node to a destination routing node and back to the originating routing node, and further including one or more other of the routing nodes;
   c) receiving the optical packet at the destination routing node; and
   d) transmitting a return signal from the destination routing node to the originating routing node in a time slot on the unidirectional looped transmission path which was occupied by the optical packet output in (a).

2. A method of operating a node in an optical communications system comprising a plurality of routing nodes, each routing node being configurable to direct a received optical packet onwards via a selected one of two or more output paths, and an optical network interconnecting the plurality of routing nodes, the method comprising:
   a) receiving an optical packet destined for the node from a unidirectional looped transmission path formed by configuring the optical network and the routing nodes, the unidirectional looped transmission path tracing a route from an originating routing node to the node and back to the originating routing node, and further including one or more other of the routing nodes; and
   b) transmitting a return signal destined for the originating routing node in a time slot on the unidirectional looped transmission path which was occupied by the packet received in (a).

3. A method according to claim 1, in which the return signal comprises one of a plurality of packets received on the looped transmission path from the originating node.

4. A method according to claim 3, further comprising modifying the said one of the plurality of packets at the destination node before returning the said one of the plurality of packets on the said looped transmission path.

5. A method according to claim 1, including monitoring the time of arrival of the return signal at the originating node, and identifying the source of the return signal from the said time of arrival.

6. A method according to claim 5, including determining at what time a return signal is expected to arrive at the originating node, and triggering a transmission failed event if no return signal arrives at the expected time.

7. A method according to claim 6, including retransmitting a packet in response to the said transmission failure event.

8. A method according to claim 1 in which the optical network has a mesh topology.

9. A method according to claim 1, in which the network comprises a multiplicity of nodes and links, and in which the nodes and links are configured as a multiplicity of directed trails, each directed trail linking some only of the multiplicity of nodes and the directed trails in combination spanning every node of the network and in which the looped signal path comprises a closed directed trail which includes both the originating node and the destination node.

10. A method according to claim 1, in which when the originating node receives, on the looped path, a contending packet from another node, after transmitting a first one of a plurality of packets to the destination node, then the originating node removes from the said path the or each contending packet.

11. A method according to claim 1, in which when the originating node receives, on the looped path, a contending packet from another node, after transmitting a first one of a plurality packets to the destination node, then the originating node suspends transmission of further packets to the destination, and passes the or each contending packet.

12. A node suitable for connection in an optical communications network, the node comprising:
   a) an input arranged to receive an optical packet from a unidirectional looped signal path;
   b) configurable means for switching an optical packet received at the input to a selected one of a plurality of outputs, the selected output being that which outputs onto the unidirectional looped signal path in the event that the optical packet was received from such said path; and
   c) means for outputting a signal onto the unidirectional looped signal path via the selected outputs in a time slot originally occupied by the said packet originally received from the unidirectional looped signal path;

wherein the unidirectional looped signal path traces a unidirectional path from an originating routing node at which the optical packet originated to a destination routing node to which the optical packet is destined, and back to the originating routing node, and further includes one or more other of the routing nodes.

13. An optical communications network including a node according to claim 12.

14. An optical communications network according to claim 13, in which the network has a mesh topology.

15. A communications network according to claim 13, in which the network comprises a multiplicity of nodes and links, and in which the nodes and links are configured as a multiplicity of directed trails, each directed trail linking some only of the multiplicity of nodes and the directed trails in combination spanning every node of the network and in which the looped signal path comprises a directed trail which spans both the originating node and the destination node.

16. A method according to claim 1, including:

transmitting a polling signal from the source node to the destination node;

scheduling a process at the source node for execution at a time after the transmission of the polling signal, which time is dependent on the return trip time between the source node and the destination node;

transmitting data from the destination node to the source node in the time slot occupied by the said polling signal; and subsequently executing the said process using the said data.

17. A method according to claim 2, in which the return signal comprises one of a plurality of packets received on the unidirectional looped transmission path from the originating node.

* * * * *